US009058711B2

(12) United States Patent
Stoeckli et al.

(10) Patent No.: US 9,058,711 B2
(45) Date of Patent: Jun. 16, 2015

(54) METHOD FOR PAYING OUT BANKNOTES BY CASH MACHINES AND CASH MACHINE FOR CARRYING OUT THE METHOD

(75) Inventors: Armin Stoeckli, Ittigen (CH); Reto Schletti, Burgdorf (CH)

(73) Assignee: BEB INDUSTRIE-ELEKTRONIK AG (CH)

( * ) Notice: Subject to any disclaimer, the term of this patent is extended or adjusted under 35 U.S.C. 154(b) by 0 days.

(21) Appl. No.: 13/640,535

(22) PCT Filed: Mar. 17, 2011

(86) PCT No.: PCT/EP2011/001330
§ 371 (c)(1),
(2), (4) Date: Oct. 11, 2012

(87) PCT Pub. No.: WO2011/131276
PCT Pub. Date: Oct. 27, 2011

(65) Prior Publication Data
US 2013/0026228 A1   Jan. 31, 2013

(30) Foreign Application Priority Data

Apr. 19, 2010   (DE) .......................... 10 2010 015 588

(51) Int. Cl.
*G06Q 40/00* (2012.01)
*G07D 11/00* (2006.01)
*G07F 19/00* (2006.01)

(52) U.S. Cl.
CPC ........ *G07D 11/0066* (2013.01); *G07D 11/0072* (2013.01); *G07F 19/203* (2013.01)

(58) Field of Classification Search
CPC ......... G07F 19/203; G07F 7/04; G07F 19/20; G07F 19/202; G07D 11/0066; G07D 11/0051; G07D 11/0069; G07D 11/0072; G07D 11/0075; G07D 7/00; G07D 7/0006; G07D 7/12; G07D 7/20; G06Q 20/1085; G06Q 20/407
USPC ................ 235/379; 705/35, 39, 43; 902/8, 9, 902/11–13; 382/135, 321; 194/206, 207
See application file for complete search history.

(56) References Cited

U.S. PATENT DOCUMENTS

| | | | |
|---|---|---|---|
| 6,065,672 A | 5/2000 | Haycock | |
| 6,550,671 B1 | 4/2003 | Brown et al. | |
| 6,573,983 B1 * | 6/2003 | Laskowski | 356/71 |
| 7,419,088 B2 * | 9/2008 | Zhao et al. | 235/379 |
| 7,454,049 B2 * | 11/2008 | Paraskevakos | 382/135 |
| 7,567,698 B2 * | 7/2009 | Paraskevakos | 382/135 |
| 7,699,153 B2 | 4/2010 | Ehrich et al. | |
| 7,835,563 B2 | 11/2010 | Hampp | |
| 7,866,545 B2 | 1/2011 | Rapf et al. | |
| 7,886,889 B2 | 2/2011 | Stein | |
| 7,903,863 B2 * | 3/2011 | Jones et al. | 382/135 |
| 7,929,749 B1 * | 4/2011 | Jones et al. | 382/135 |
| 2004/0028266 A1 | 2/2004 | Jones et al. | |
| 2005/0047593 A1 | 3/2005 | Hampp | |
| 2008/0236990 A1 | 10/2008 | Ehrich et al. | |
| 2008/0283589 A1 | 11/2008 | Rapf et al. | |
| 2009/0095663 A1 | 4/2009 | Stein | |
| 2010/0032477 A1 * | 2/2010 | Faulkner | 235/379 |
| 2010/0051687 A1 * | 3/2010 | Jones et al. | 235/379 |
| 2012/0070061 A1 | 3/2012 | Stockli | |
| 2012/0176605 A1 | 7/2012 | Stoeckli et al. | |

FOREIGN PATENT DOCUMENTS

| | | |
|---|---|---|
| CN | 1636222 A | 7/2005 |
| CN | 101303779 A | 11/2008 |
| CN | 101425194 A | 5/2009 |
| DE | 10360862 A1 | 7/2005 |
| DE | 10-2004-060316 A1 | 6/2006 |
| EP | 1122696 A1 | 8/2001 |
| EP | 1531432 A2 * | 5/2005 |
| WO | WO-03-052701 A2 | 6/2003 |
| WO | WO-2005-017842 A1 | 2/2005 |

OTHER PUBLICATIONS

International Search Report (in German with English translation) for PCT/EP2011/001330, mailed Aug. 2, 2011; ISA/EP.
German Search Report (in German) for German Application No. 10 2010 015 588.8, dated Jan. 24, 2011.
English translation of Chinese Office Action for Application No. 2011 80020032.2 dated Aug. 11, 2014 (24 pages).

* cited by examiner

*Primary Examiner* — Michael G Lee
*Assistant Examiner* — Suezu Ellis
(74) *Attorney, Agent, or Firm* — Harness, Dickey & Pierce, P.L.C.

(57) ABSTRACT

A method for paying out banknotes by cash machines and a cash machine for carrying out the method. For each banknote paid out to a customer, an individual characteristic feature of the banknote that distinguishes it from other banknotes is recorded. In addition, the data of the customer and/or the data for the paying-out transaction are recorded for each banknote dispensed to a customer. The cash machine is equipped with at least one sensor for sensing the individual characteristic feature of each banknote to be dispensed.

15 Claims, No Drawings

METHOD FOR PAYING OUT BANKNOTES BY CASH MACHINES AND CASH MACHINE FOR CARRYING OUT THE METHOD

CROSS-REFERENCE TO RELATED APPLICATIONS

This application is a National Stage of International Application No. PCT/EP2011/001330, filed Mar. 17, 2011, and published in German as WO 2011/131276 A1 on Oct. 27, 2011. This application claims the benefit and priority of German Application 10 2010 015 588.8, filed Apr. 19, 2010. The entire disclosures of the above applications are incorporated herein by reference.

BACKGROUND

This section provides background information related to the present disclosure which is not necessarily prior art.

TECHNICAL FIELD

The invention derives from a method for paying out banknotes by a cash machine and a cash machine for carrying out the method.

DISCUSSION

A cash machine is an apparatus for the automatic paying-out and/or paying-in of cash, preferably in the form of banknotes. Cash machines are also referred to as ATMs (automated teller machines) where they are used for conducting banking transactions. In addition, cash machines may be used at filling stations or in hypermarkets for the automatic processing of a payment transaction. Various types of cash machines are known: cash dispensers, cash deposit machines and cash recycling machines. A customer can usually draw cash from his/her bank account at cash dispensers. These therefore dispense banknotes to a customer. A customer can pay in cash at cash deposit machines, for example into his/her bank account or to carry out a payment transaction. Banknotes are therefore fed into a cash deposit machine by a customer. Cash recycling machines allow the customer to both withdraw cash and pay cash in. Banknotes are therefore both deposited and dispensed.

For the depositing of banknotes, one or more sensors integrated into the cash machine normally check the banknotes for authenticity and for forgeries. If a forgery is detected, it is retained in order to withdraw it from circulation.

However, the possibility that a forged or otherwise invalid banknote will not be detected cannot be altogether ruled out. Invalid banknotes include not just forgeries, but also banknotes that have been rendered invalid by a special marking, such as dyeing or a stamp. If an invalid banknote is not detected when it is deposited in a cash machine and therefore not withdrawn, it could be dispensed again to a customer by a cash dispenser or a cash recycling machine. It is a disadvantage that a customer who receives such an invalid banknote cannot prove that it was dispensed by a cash machine. Furthermore, a customer can falsely claim to have received an invalid banknote paid out by a cash machine. In both cases, the operator of the cash machine has no means of tracing the banknotes dispensed by a cash machine and matching them up to individual customers. He/she is faced with an assertion by a customer, which he/she is unable to verify. Nor does the customer have any means of substantiating his/her assertion, unless there are witnesses.

SUMMARY OF THE INVENTION

The invention is based on the task of providing a method of paying out banknotes at cash machines, as well as a cash machine for carrying out the method, which allow the banknotes dispensed to customers to be traced.

This task is solved by a method and by a cash machine. The method is distinguished in that for each banknote paid out to a customer, an individual characteristic feature of the banknote that distinguishes it from other banknotes is recorded. The individual characteristic features are either specified or sensed by one or more sensors. Such individual features may for example be the serial number. Every banknote bears a serial number. There is a different serial number on each banknote. A banknote can therefore be distinguished from other banknotes by the serial number. Other individual features of banknotes may for example include the intrinsic, individual fibre structure, the direction and position of certain distinguishing features, print offset, damage, a barcode, a matrix code or an RFID chip.

If cash cassettes with banknotes are used in a cash machine, the serial numbers of the banknotes deposited and/or other individual features can be recorded in a storage device in the cash cassette. The individual features are thus already defined in the cash machine and do not need to be determined. There is also the possibility of equipping the cash machine with a sensor, which determines the corresponding individual feature of a banknote immediately before it is dispensed to a customer. It may for example take the form of an optical sensor. It is capable of reading the serial number of a banknote by means of optical character recognition. Other individual features of banknotes can likewise be determined optically. It is in addition possible to use sensors that determine individual features of banknotes from certain electrical or magnetic characteristics. The sensor depends on the individual feature that is to be detected on the banknotes.

If a banknote is a forgery, its serial number may be identical to the serial number of a genuine banknote. In order to distinguish the two banknotes, it may be helpful to detect at least one other individual feature of the banknotes, such as the fibre structure, any damage, or missing security features. In order to assure an exact reconstruction, all signals sensed by the sensor, known as raw signals, can be recorded. These include for example scan images taken by the sensor, in full or reduced resolution.

The individual features of the banknotes dispensed at a cash machine are linked to the data for a transaction. These include the data of the customer to whom the banknote was paid out or the data for the paying-out transaction, or both. This data may for example be customers' account details, and in particular the account number and sort code, the name, the location of the cash machine, and the date and time of the transaction. This data, either on its own or in combination with other data stored in databases, allows a banknote to be matched up unambiguously to a customer. A banknote can thus be traced. If a customer asserts that he/she has received an invalid banknote from a cash machine, this can be checked by means of the data recorded, if necessary upon presentation of the banknote in question.

The characteristic feature and the data of a customer or the corresponding transaction can be recorded for every banknote or only for certain banknotes. If they are recorded only for certain banknotes, this may for example be restricted to cases where the customer rejects the banknotes dispensed to him/her and deposits them in the cash machine again. On the other hand if a customer does not object to the banknotes dispensed to him/her, the data may not be recorded. The overall data volume can be reduced in this way. On the other hand in cases where dispensed banknotes are rejected, a wide range of data can be recorded, for instance scan images in full resolution taken by an optical sensor.

The method can be used both for cash machines that only dispense cash, and for cash recycling machines. Cash recycling machines are often equipped with at least one sensor that determines characteristic features of the banknotes deposited in order to allow invalid banknotes to be traced from the moment they are deposited. If these features are fed into a storage device, the relevant features are already known and determined when these banknotes are dispensed to a customer. They therefore do not need to be determined again. However if the features of the banknotes detected upon depositing and upon dispensing differ, an additional sensor is necessary. The additional sensor and the checking of banknotes for individual features upon dispensing increase the likelihood of detecting forgeries.

The customer may be a customer of the bank that operates the cash machine or a member of bank staff. Cash is usually paid out by a cash machine even when the bank customer is served by a member of bank staff. In this instance, a banknote paid out can be matched not just to the data of the bank customer, but also to the member of bank staff's data. This data forms part of the transaction data.

DETAILED DESCRIPTION OF THE PREFERRED EMBODIMENTS

According to an advantageous embodiment of the invention, the banknotes are placed in a cassette before dispensing to customers. When the banknotes are being placed in the cassette, at least one individual feature of each banknote is recorded, so that the individual features of the banknotes are known and defined when they are paid out. In this instance, however, a sensor to determine individual features of the banknotes is possible but not absolutely essential. If the cash machine is a cash dispenser, the banknotes are inserted into the cash machine in cash cassettes. The individual features of the banknotes are therefore recorded outside the cash machine, when the cash cassette is filled. On the other hand if the cash machine is a cash recycling machine, inside the cash machine there is a cash cassette that is stocked with the banknotes being paid in at the cash machine, and depleted as the cash machine pays out banknotes. In this instance the data concerning the individual feature of banknotes is recorded at the cash recycling machine. On the other hand if a full cash cassette is placed in the cash recycling machine, recording can take place in the same way as for cash dispensers.

According to a further advantageous embodiment of the invention, at least one individual feature of each banknote is determined by at least one sensor immediately before dispensing to a customer. If the individual features are determined immediately before dispensing of the banknotes, the likelihood of transmission errors or of incorrectly matching the banknote and individual feature is eliminated or at least reduced.

According to a further advantageous embodiment, a serial number, barcode, matrix code and/or data stored in an RFID chip on a banknote are recorded as individual characteristic features.

According to a further advantageous embodiment of the invention, the banknotes dispensed to a customer are accepted back by the cash machine immediately after dispensing, if the customer wishes. The customer can therefore feed the banknotes dispensed by a cash machine back into the cash machine after he/she has had the opportunity to examine them visually. If the customer establishes that the banknotes dispensed include a forgery or at least a banknote that he/she suspects is a forgery, the customer can decline to accept the banknotes and feed the banknotes back into the cash machine. In this instance the banknotes fed in should be checked to establish whether they tally with the banknotes previously dispensed. Banknotes fed into the cash machine are only accepted by the cash machine if their distinguishing features correspond to those of the banknotes previously dispensed to the customer.

According to a further advantageous embodiment of the invention, after the banknotes have been dispensed the customer has the option of accepting or rejecting the banknotes dispensed, by means of a display device on the cash machine. If the reject option is chosen, the banknotes are fed into the cash machine by the customer. The customer can then choose whether to cancel the banknote paying-out process or to request to be paid out in different banknotes.

According to a further advantageous embodiment of the invention, at least one individual feature of the banknotes is determined by a sensor when the banknotes are fed in. This allows the banknotes rejected by a customer to be checked again when they are fed back into the cash machine. If the banknotes do not match the banknotes previously dispensed by the cash machine, they are dispensed to the customer again. In this instance they are debited to the customer's account despite being rejected.

The cash machine according to the invention for the paying-out of banknotes to a customer and for carrying out the method according to the invention is characterised in that it is equipped with at least one sensor sensing one individual characteristic feature on each banknote to be dispensed. It is beneficial that it is also equipped with a data processing device that matches up the individual characteristic feature sensed by the sensor, for every banknote for dispensing to a customer, with the data of the customer and/or for the paying-out transaction. This makes it possible to match up a banknote unambiguously to a customer to whom the banknote was dispensed by the cash machine.

According to a further advantageous embodiment of the invention, the cash machine is equipped with an interface in order to transfer the individual features of the banknotes sensed by the sensor to an external data processing device. In this way the matching-up of a banknote dispensed by a cash machine with a customer to whom the banknote was dispensed by the cash machine takes place outside the cash machine.

According to a further advantageous embodiment of the invention, the cash machine unit is equipped with at least one sensor. This sensor senses at least one feature of the dispensed banknotes that are rejected by a customer, once they have been fed back into the cash machine. In this way, it can be checked that the banknotes dispensed are identical to those fed back into the cash machine.

Further advantages and advantageous embodiments are presented in the claims.

All features of the invention can be material to the invention both individually and in any combination.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

The invention claimed is:

1. A method for paying out banknotes by a cash machine, comprising:
   recording, for each one of the banknotes paid out by the cash machine to a customer during a transaction, an individual characteristic feature of each one of the banknotes that individually distinguishes each one of the banknotes;
   recording, for each one of the banknotes paid out by the cash machine to the customer during the transaction, customer data and transaction data;
   linking the individual characteristic feature of each one of the banknotes paid out to at least one of the customer data or the transaction data;
   displaying to the customer on a display of the cash machine an accept option for accepting the banknotes paid out by the cash machine, and a reject option for rejecting the banknotes paid out by the cash machine;
   if the reject option is selected, receiving back into the cash machine upon being fed into the cash machine by the customer, one or more of the banknotes paid out by the cash machine; and
   if the accept option is selected, deleting the recorded individual characteristic feature, the customer data, and the transaction data; and if the reject option is selected, retaining the recorded individual characteristic feature, the customer data, and the transaction data.

2. The method according to claim 1, wherein the banknotes are placed in a cash cassette before being paid out by the cash machine, and the individual characteristic feature or a different individual characteristic feature of each of the banknotes is recorded and stored when the banknotes are placed in the cash cassette.

3. The method according to claim 1, wherein the individual characteristic feature of each one of the banknotes is determined and recorded by at least one sensor immediately before the banknotes are paid out.

4. The method according to claim 1, wherein at least one of a serial number, a barcode, a matrix code, or data stored on an RFID chip on a banknote, is recorded as the individual characteristic feature.

5. The method according to claim 1, wherein the customer data includes bank account details of the customer.

6. The method according to claim 1, wherein the transaction data includes a place, date, and time of paying out the banknotes.

7. The method according to claim 1, wherein if the reject option is selected, receiving back into the cash machine the banknotes paid out by the cash machine immediately after the banknotes are paid out by the cash machine.

8. The method according to claim 7, further comprising detecting with a sensor the individual characteristic feature or a different individual characteristic feature upon receiving back into the cash machine the banknotes paid out by the cash machine.

9. The method according to claim 1, further comprising prompting the customer for permission to retain the customer data.

10. The cash machine for paying out banknotes to the customer configured for carrying out the method of claim 1, wherein the cash machine is equipped with at least one first sensor for recording the individual characteristic feature, and the cash machine is equipped with a data processing device that links the individual characteristic feature recorded by the first sensor with at least one of the customer data or the transaction data.

11. The cash machine according to claim 10, wherein the cash machine is equipped with an interface for output of the individual characteristic feature of each one of the banknotes recorded by the first sensor to an external data processing device.

12. The cash machine according to claim 10, wherein the first sensor is an optical camera that detects serial numbers of the banknotes and evaluates the serial numbers by image processing.

13. The cash machine according to claim 10, further comprising recording with a second sensor of the cash machine the individual characteristic feature, or a different individual characteristic feature, of each one of the banknotes as the banknotes are received back into the cash machine upon being fed into the cash machine by the customer.

14. A method for paying out banknotes by a cash machine comprising:
   recording for each one of the banknotes paid out by the cash machine to a customer during a transaction, an individual characteristic feature of each one of the banknotes that distinguishes each one of the banknotes;
   recording customer data and transaction data for each one of the banknotes paid out by the cash machine to the customer during the transaction;
   transferring the individual characteristic feature of each one of the banknotes paid out, the customer data, and the transaction data to a data processing device external to the cash machine by way of an interface of the cash machine;
   associating the individual characteristic feature of each one of the banknotes paid out with the customer data and the transaction data using the data processing device external to the cash machine to identify the customer that has received the banknotes paid out by the cash machine;
   displaying to the customer on a display of the cash machine an accept option for accepting the banknotes paid out by the cash machine, and a reject option for rejecting the banknotes paid out by the cash machine;
   if the reject option is selected, receiving back into the cash machine upon being fed into the cash machine by the customer, one or more of the banknotes paid out by the cash machine;
   deleting the recorded individual characteristic feature, the customer data, and the transaction data if the accept option is selected; and
   retaining the recorded individual characteristic feature, the customer data, and the transaction data if the reject option is selected.

15. The method of claim 14, further comprising prompting the customer for permission to retain the customer data.

* * * * *